United States Patent [19]

Racchi

[11] Patent Number: 4,646,864
[45] Date of Patent: Mar. 3, 1987

[54] INTEGRAL SILENCER PAD AND WATER DEFLECTOR

[75] Inventor: Theodore T. Racchi, Detroit, Mich.

[73] Assignee: Chrysler Motors Corporation, Highland Park, Mich.

[21] Appl. No.: 784,968

[22] Filed: Oct. 7, 1985

[51] Int. Cl.⁴ .............................................. B62D 25/10
[52] U.S. Cl. ................................. 180/69.22; 180/69.25; 181/204
[58] Field of Search .................... 180/68.1, 68.2, 68.3, 180/69.22, 69.25; 181/204

[56] References Cited

U.S. PATENT DOCUMENTS

| | | | |
|---|---|---|---|
| 1,241,974 | 10/1917 | Hicks | 180/69.25 |
| 1,335,082 | 3/1920 | Stowe | 180/69.25 |
| 1,605,122 | 11/1926 | Lucas | 180/69.25 |
| 1,637,947 | 8/1927 | Turner | 180/69.25 |
| 1,844,727 | 2/1932 | Vorst | 180/69.25 X |
| 2,897,916 | 8/1959 | Probst | 183/62 |
| 3,112,810 | 12/1963 | Nallinger | 181/33 |
| 3,800,910 | 4/1974 | Rose | 181/35 A |
| 3,923,114 | 12/1975 | Suzuki | 181/204 X |
| 4,197,826 | 4/1980 | Fachbach et al. | 181/204 X |
| 4,539,252 | 9/1985 | Franz | 181/204 X |
| 4,562,895 | 1/1986 | Kirchweger | 180/68.1 |

Primary Examiner—John J. Love
Assistant Examiner—Michael Mar
Attorney, Agent, or Firm—Gerald P. Dundas

[57] ABSTRACT

An engine compartment sound and water shield pad fabricated of a material which provides sound and vibration control and which has an integrally formed waterproof drain tray portion. The pad is particularly suited to be carried on the underside of a vehicle hood panel which is provided with louvers to facilitate the flow of air through an engine compartment enclosed by the hood.

3 Claims, 3 Drawing Figures

INTEGRAL SILENCER PAD AND WATER DEFLECTOR

FIELD OF THE INVENTION

This invention relates to sound and water shielding. In particular, it relates to such shielding having special application to ventilated motor compartments wherein ventilation means are used to facilitate air flow through the compartment. The invention finds special application with respect to motor vehicles in which the engine compartment includes a movable ventilated hood which forms a part of the vehicle body.

BACKGROUND OF THE INVENTION

The engine compartment cover or hood of a car or truck, whether at the front or rear of the vehicle, generally provides a major definition of vehicle styling and is a relatively large, thin walled member which readily transmits sound vibrations to other areas of the vehicle. Accordingly, it has become common practice to cover the inner surface of the hood with sound absorbing material which generally takes the form of a pad secured to the underside of the hood. The attachment of this pad is generally by adhesive, mechanical fasteners or combinations thereof. Recently, to combat high engine compartment temperatures, it has frequently been found desirable to provide ventilators in the hood to facilitate air flow for engine operating and cooling. Such ventilators provide an opening in the form of groups of slits or grids in the hood which, while desirable or even necessary for optimum engine performance, present other problems. Thus, to provide air passage and avoid water damage, the underhood sound absorbing pad is deleted from the area of the ventilator and additional separate shields or baffles are secured to the underside of the hood. Such shields, which heretofore were metal or plastic, are solely to entrap and divert water entering the engine compartment through the ventilator during rain or car washing conditions from impinging upon the engine or other components located in the engine compartment. Such additional water shield baffle structure adds to the weight, expense and assembly complexity of the hood member and does not serve to reduce noise. Moreover, such baffles frequently present vibration problems which require isolation of the baffles from other components.

BACKGROUND ART

The early art was primarily concerned with engine compartment water shielding while the later art concerned noise control. None of the art suggest any type of sound control underhood pad having an integral water shielding drain tray. Thus, U.S. Pat. Nos. 1,335,082 and 1,637,947 suggest the use of drain troughs secured to the underhood to prevent water from reaching the spark plugs and other engine components. No sound deadening is provided by this approach.

U.S. Pat. No. 1,241,974 issued to Claud J. Hicks discloses an auxiliary hood positioned below the regular hood and above the engine so as to deflect from the engine water which passes through the outer hood. Again, no sound deadening is accomplished.

U.S. Pat. No. 2,897,916 issued to Probst discloses an air cleaner silencer assembly which is part of the engine hood. It contains no teachings relative to water shielding. Similarly, U.S. Pat. No. 3,112,810 issued to Nallinger relates to noise dampening but contains no suggestions relative to water shielding. Likewise, U.S. Pat. No. 3,800,910 issued to J. H. Rose is concerned only with noise suppression and does not address the problems of water shielding and engine ventilation. In summary, none of the prior art addresses the problem of protecting underhood components from water while at the same time providing for underhood air flow and sound absorption.

SUMMARY OF THE INVENTION

It is an object of the present invention to provide a lining element which serves the dual functions of sound dampening and water shielding and which is especially adaptive for use in vehicle engine compartment environments. The lining comprises a substantially self-supporting integral structure fabricated of a material having sound dampening properties such as bonded soft fibre board, urethane or other plastic synthetic foam rubber, etc. and further including a portion thereof which is waterproofed and formed to drain water from the lining.

The above described lining element of this invention is supported or suspended to the underside of the vehicle engine hood by suitable conventional fastening or adhesive means and is positioned such that the waterproofed area is in registry with ventilators or air passage louvers located in the hood of the vehicle. The lining is contoured such that water entering the hood ventilators is deposited in the waterproofed area of the lining which in turn is shaped to spill the water from the lining and away from the vehicle engine and electrical components.

The lining element of this invention addresses the two problems of sound and water shielding with a minimum of complexity. It eliminates the need for the multiple structure now used and which generally include water shields which add considerable weight to the hood and demand separate assembly steps and which frequently produce as well as transmit sound vibrations.

DESCRIPTION OF THE DRAWINGS

The features and advantages of the sound and water shield of this invention will be more clearly understood from the following description taken in conjunction with the accompanying drawing in which like reference numerals designate similar or corresponding structures, members and elements and in which.

DESCRIPTION OF THE PREFERRED EMBODIMENT

Figure 1:
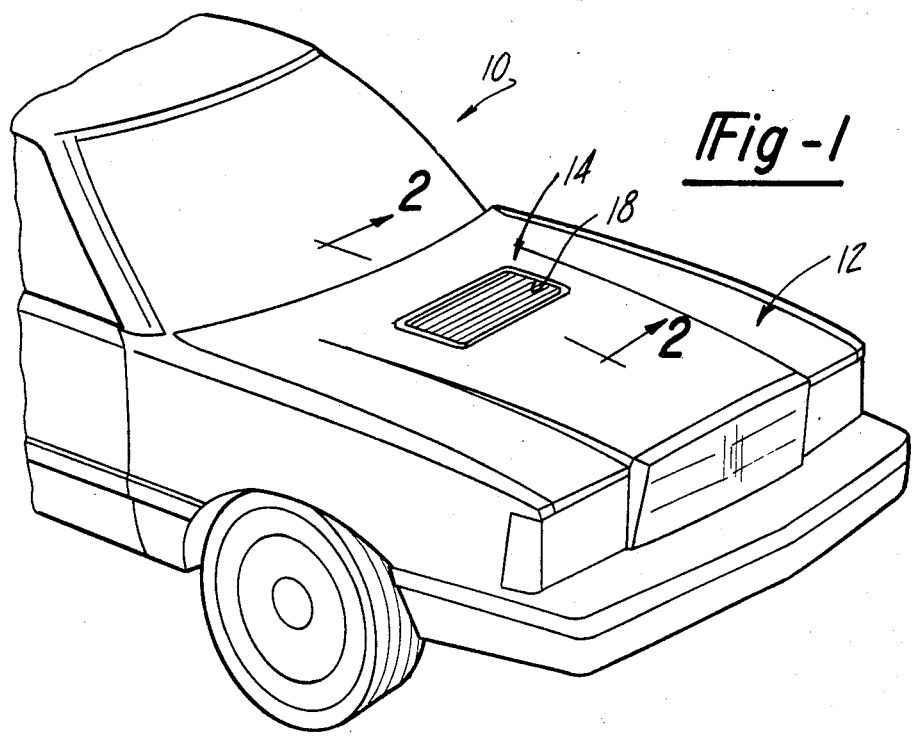
FIG. 1 is a perspective view of the front portion of an automobile having a hood panel covering the engine compartment with the hood being provided with an air passage ventilator or louver to facilitate the exhausting of hot air from the engine compartment.

With reference to FIG. 1, the front portion of a motor vehicle 10 is shown having a hood 12. Hood 12 overlies the engine compartment of the vehicle and is adapted to be pivotally mounted to other components of the vehicle body so as to open and provide access to the vehicle engine compartment. To facilitate engine cooling, a hood louver 14 having air passage slots 16 is located in an aperture 18 in the hood and facilitates the exhausting of air from the engine compartment. The hood 12 comprises a wall 20 of sheet material of any suitable kind, but generally metal or plastic, and is generally reinforced by a frame or inner panel (not shown).

Figure 3:
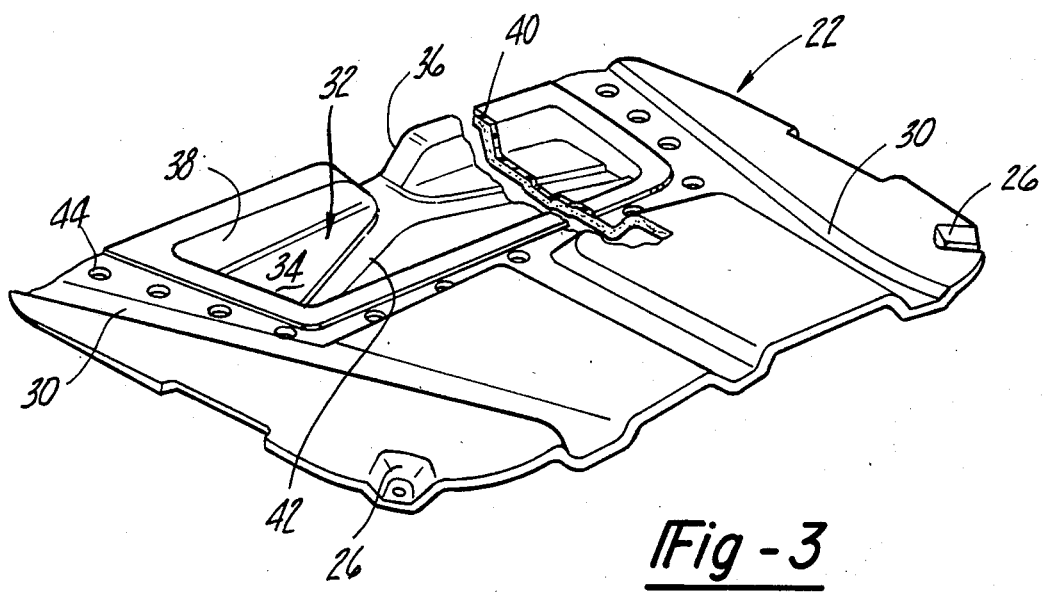
FIG. 3 is a perspective view of the sound and water shield pad of this invention.

The sound absorbing and water shield pad 22 of the invention is shown in FIG. 3 and comprises a substantially self-supporting material 24 which may be of any suitable sound deadening material as described above. Excellent results have been obtained with a pad made of medium-fine glass fibers having a density of about 1.00 pound per cubic foot and being approximately 0.00020 inch in diameter. The glass fibre was held together by a phenolic resin binder. The percent of phenolic binder used when fabricating molded hood silencers should be in the 12 to 20% by weight range. The pad was moldproof, water and fire resistant and has a nominal material thickness of 44.5 mm.

The pad of this invention may be secured to the underside of the vehicle hood 12 by mechanical or adhesive fastening means including locking tabs 26 and screw fasteners 28. While generally having a flat profile, the pad is contoured as at 30 to fit generally flush with the underside of the hood.

Figure 2:
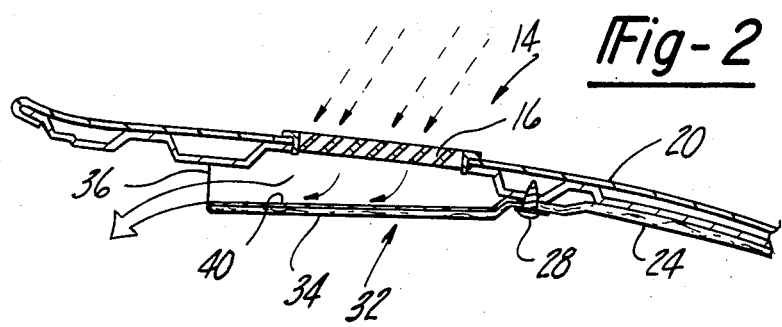
FIG. 2 is a cross-sectional view taken on line 2—2 of FIG. 1.

As seen with particular reference to FIG. 2, the sound absorbing and water shield pad 22 of the invention is formed with a depressed portion 32 which forms a drain tray and which is positioned to lie below the hood louvers 14. The bottom wall 34 of this drain tray is sloped such that water entering the drain tray through the hood louver 14 will flow out of the drain tray through an opening 36 in a rearward wall 38 of the drain tray and free of the other components located in the engine compartment. The drain tray surface portion of the pad is waterproofed with any appropriate waterproofing compound 40 and good results have been obtained with a mastic barrier marketed by the Globe Company under the name "Calendered Elastomer KJB Barier". Optionally, where space is at a minimum between the hood and engine compartment components, troughs 42 may be molded into the bottom 34 of the drain to facilitate the flow of water from the tray. A plurality of air passage openings 44 are located in the pad at any point remote from the drain tray depressed portion 32 to facilitate air passage from the engine compartment through the sound and water shield pad 22 and out through the hood cover 14.

While the present invention has been disclosed in connection with the preferred embodiment thereof, it should be understood that there may be other embodiments which fall within the spirit and scope of the invention and that the invention is susceptible to modification and variation without departing from the scope and fair meaning of the following claims.

What is claimed is:

1. A one-piece sound absorbing and water drain pad adapted to be mounted adjacent the underside of an automotive vehicle hood having an air passage ventilator and designed to overlie a vehicle engine, said pad comprising a substantially self-supporting flat sheet of material contoured to lie against said hood, said pad being dimensioned to cover a substantial portion of the underside of said hood and having an integral depressed portion located at the rear of the pad, said depressed portion being coated with a waterproof material for forming a water drain tray, said tray having a base, side walls, a rear wall, and an opening extending through said rear wall tray, said drain tray being positioned to be in general registry with and beneath said hood ventilator such that water entering through said hood ventilator collects in said tray and said base of said tray being inclined to cause water to drain away from said pad and said vehicle engine through said opening provided in said rear wall of said tray.

2. A sound absorbing and water drain pad according to claim 1 wherein the pad comprises a medium fine glass fiber bonded together by a phenolic resin binder.

3. In an automotive vehicle having an engine compartment, an engine therein and a hood having an air passage ventilator, said hood partially defining said engine compartment and covering said engine, a one-piece sound absorbing and water drain pad carried on the underside of said hood and covering a substantial portion of the hood; said pad having an integral depressed portion located at the rear of the pad, said depressed portion being coated with a waterproof material for forming a water drain tray, said tray having a base, side walls, a rear wall, and an opening extending through said rear wall, said drain tray being positioned to lie in general registry with and beneath said hood ventilator and said base of said tray being inclined to cause water which enters said tray to drain away from said pad and said vehicle engine through said opening provided in said rear wall of said tray.

* * * * *